(12) United States Patent
Park et al.

(10) Patent No.: US 12,341,935 B2
(45) Date of Patent: Jun. 24, 2025

(54) POWER SEQUENCE CONTROL OF INTEGRATED SCANNER ASSEMBLY AND IMAGE FORMING ENGINE

(71) Applicant: Hewlett-Packard Development Company, L.P., Spring, TX (US)

(72) Inventors: In Park, Seongnam (KR); Jun Young Lee, Seongnam (KR); Eun Seok Park, Seongnam (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 188 days.

(21) Appl. No.: 18/031,044

(22) PCT Filed: May 10, 2021

(86) PCT No.: PCT/US2021/031502
§ 371 (c)(1),
(2) Date: Apr. 10, 2023

(87) PCT Pub. No.: WO2022/081209
PCT Pub. Date: Apr. 21, 2022

(65) Prior Publication Data
US 2023/0379417 A1     Nov. 23, 2023

(30) Foreign Application Priority Data
Oct. 12, 2020   (KR) .................... 10-2020-0131054

(51) Int. Cl.
*H04N 1/00* (2006.01)
*B41J 29/38* (2006.01)
(Continued)

(52) U.S. Cl.
CPC .......... *H04N 1/00891* (2013.01); *B41J 29/38* (2013.01); *G06F 1/189* (2013.01);
(Continued)

(58) Field of Classification Search
CPC .......... H04N 1/00891; H04N 1/00904; H04N 2201/0094; H04N 2201/0081; B41J 29/38;
(Continued)

(56) References Cited

U.S. PATENT DOCUMENTS 8,336,977 B2    12/2012   Narushima et al.
8,351,813 B2 *   1/2013   Hashimoto ........ H04N 1/00891
                                                          399/88
(Continued)

FOREIGN PATENT DOCUMENTS

JP    2002-273978 A    9/2002
JP    2011-079176 A    4/2011
(Continued)

*Primary Examiner* — Thomas J. Cleary
(74) *Attorney, Agent, or Firm* — Brooks, Cameron & Huebsch, PLLC

(57) ABSTRACT

A power control device includes a power supply, an integrated scanner assembly (ISA), an image forming engine including a general engine unit and a special engine unit, a main power switch, a special engine unit power switch, and a processor including an independent power controller, and the processor to control power supplied to the ISA and the general engine unit by closing the main power switch through the independent power controller, to receive specification information from the ISA activated by the supplied power, to receive state information on the image forming engine from the general engine unit activated by the supplied power, and to supply power to the special engine unit by closing the special engine unit power switch after receiving the specification information and the state information.

15 Claims, 8 Drawing Sheets

(51) Int. Cl.
*G06F 1/18* (2006.01)
*G06F 1/26* (2006.01)
*G06F 1/3215* (2019.01)
*G06F 1/3234* (2019.01)
*G06F 1/3287* (2019.01)
*G06K 15/00* (2006.01)

(52) U.S. Cl.
CPC .............. *G06F 1/26* (2013.01); *G06F 1/3215* (2013.01); *G06F 1/3284* (2013.01); *G06F 1/3287* (2013.01); *G06K 15/406* (2013.01); *H04N 1/00904* (2013.01); *H04N 2201/0094* (2013.01)

(58) Field of Classification Search
CPC .......... G06F 1/26; G06F 1/263; G06F 1/3284; G06F 1/3287; G06F 3/1229; G06F 3/1232; G06F 3/1293; G06F 3/1294; G06F 1/189; G06F 1/3215; G06F 1/3228; G06K 15/406
See application file for complete search history.

(56) References Cited

U.S. PATENT DOCUMENTS

| | | | |
|---|---|---|---|
| 9,285,850 B2 * | 3/2016 | Yokoyama | G06F 9/4411 |
| 9,621,061 B2 | 4/2017 | Hayasaki et al. | |
| 2001/0048532 A1 * | 12/2001 | Nishizawa | H02J 9/005 |
| | | | 358/1.14 |
| 2005/0200893 A1 | 9/2005 | Silverbrook et al. | |
| 2006/0083564 A1 | 4/2006 | Yazawa et al. | |
| 2007/0260358 A1 | 11/2007 | Katoh | |
| 2007/0277048 A1 * | 11/2007 | Yamasaki | G06F 1/3287 |
| | | | 713/310 |
| 2010/0128504 A1 | 5/2010 | Lee et al. | |
| 2014/0218757 A1 * | 8/2014 | Konosu | H04N 1/00965 |
| | | | 358/1.14 |
| 2015/0261168 A1 | 9/2015 | Yokoyama et al. | |
| 2016/0057303 A1 * | 2/2016 | Fujita | H04N 1/00899 |
| | | | 358/1.14 |
| 2016/0070222 A1 * | 3/2016 | Fukushima | H04N 1/00896 |
| | | | 399/88 |
| 2017/0289376 A1 * | 10/2017 | Hikichi | G03G 15/80 |
| 2018/0131269 A1 * | 5/2018 | Okuzono | H04N 1/00896 |
| 2018/0309891 A1 * | 10/2018 | Matsunaga | G06F 3/1239 |
| 2020/0106909 A1 * | 4/2020 | Hashimoto | H04N 1/001 |
| 2021/0271196 A1 * | 9/2021 | Kato | G03G 15/80 |

FOREIGN PATENT DOCUMENTS

| | | |
|---|---|---|
| JP | 2016-034712 A | 3/2016 |
| JP | 2016-218270 A | 12/2016 |
| WO | 2018/216994 A2 | 11/2018 |

* cited by examiner

POWER SEQUENCE CONTROL OF INTEGRATED SCANNER ASSEMBLY AND IMAGE FORMING ENGINE

BACKGROUND

An image forming apparatus is a printing apparatus that prints print data generated in a terminal apparatus such as a computer on a print paper, and an example of the image forming apparatus is a copier, a printer, a facsimile, a scanner, or a multifunction peripheral (MFP) that combines the functions thereof.

DETAILED DESCRIPTION

Hereinafter, various examples will be described in detail with reference to the drawings. The examples described below may be modified and implemented in various different forms.

In the present disclosure, an element may be referred to as being "connected" with another element, to include cases of being directly connected, and also cases of being connected indirectly, for example with another element therebetween. Also, an element may be referred to as "including" another element, to indicate that the element may not exclude another element and may further include additional elements, unless specifically stated otherwise. Each example may be implemented or operated independently, or each example may be implemented or operated in combination.

In the present disclosure, the term "image forming job" may refer to various jobs (e.g., printing, scanning or faxing) related to an image, such as forming the image or generating/storing/transmitting an image file, and the term "job" may mean the image forming job in some examples, and may also mean a series of processes necessary for performing the image forming job in other examples.

In addition, the term "print data" may mean data converted into a printable format by the printer. When the printer supports direct printing, the file itself may be print data.

Also, the term "image forming apparatus" may refer to an apparatus that prints print data generated by a terminal apparatus such as a computer on a recording paper. Examples of such an image forming apparatus include a copier, a printer, a facsimile, or a multi-function printer (MFP) that combines functions thereof through a single apparatus.

Also, the term "user" may refer to a person who performs an operation related to an electronic apparatus using the electronic apparatus or a device connected with the electronic apparatus by wired or wirelessly.

The term "integrated scanner assembly" may refer to a scanner unit that reads an image on a script and obtains data.

The term "special engine unit" may refer to a unit in an image forming engine performing an operation that may cause a critical problem or damage a user when abnormal control is performed in an image forming engine. The term "general engine unit" may refer to a remaining engine unit except a special engine unit in an image forming engine.

Figure 1:
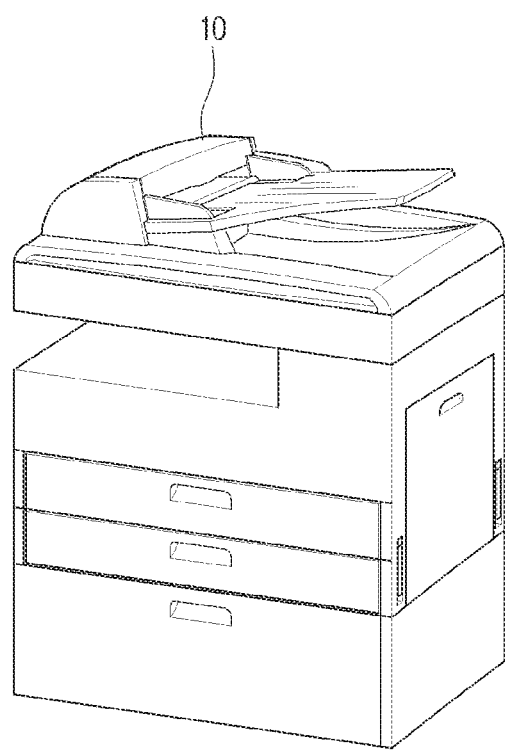
FIG. 1 is a diagram illustrating an image forming apparatus according to an example.

FIG. 1 is a diagram illustrating an image forming apparatus according to an example.

An image forming apparatus 10 may receive power and perform an image forming operation. The image forming apparatus 10 may perform an initialization process before performing an image forming operation when power is supplied. For example, the image forming apparatus 10 may initially receive power source and perform an initialization process, or may perform an initialization process when a standby state is shifted to an operating state.

The image forming apparatus 10 may receive power and supply an operation power (e.g., 5V) to a processor first. When the processor initialization is completed and the processor is in a state to control each part of the image forming apparatus 10, the processor may apply the power control signal to a switch. The switch to which the power control signal is applied may be closed (short-circuit state, turn-off), and may provide a power (e.g., 24V) to operate the integrated scanner assembly and the image forming engine from the power supply. The integrated scanner assembly and the image forming engine applied with power may transmit various information to the processor and perform the operation. If power is applied to the special engine unit of the image forming engine first, before the initialization of the processor is completed, the image forming apparatus may operate abnormally or damage the user. The image forming apparatus needs to control the supply of power according to the power supply sequence to prevent abnormal operation or damage to the user, and a lot of time may be required until performing an operation.

The image forming apparatus 10 of the present disclosure may first supply power to an image forming engine except a special engine and the integrated scanner assembly (ISA) before the initialization of the processor is completed. The image forming apparatus 10 may first obtain information required for waking up during the initialization process of the processor. The image forming apparatus 10 may not supply power to the special engine unit of the image forming engine until initialization of the processor is completed. The image forming apparatus 10 may supply power to the special engine unit of the image forming engine sequentially after initialization of the processor is completed. The image forming apparatus 10 may prevent abnormal operation or risk of accidents and may reduce the wake-up time of the image forming apparatus 10 and efficiently processes the software.

A sequence control process of the image forming apparatus will be described in detail.

Figure 2:
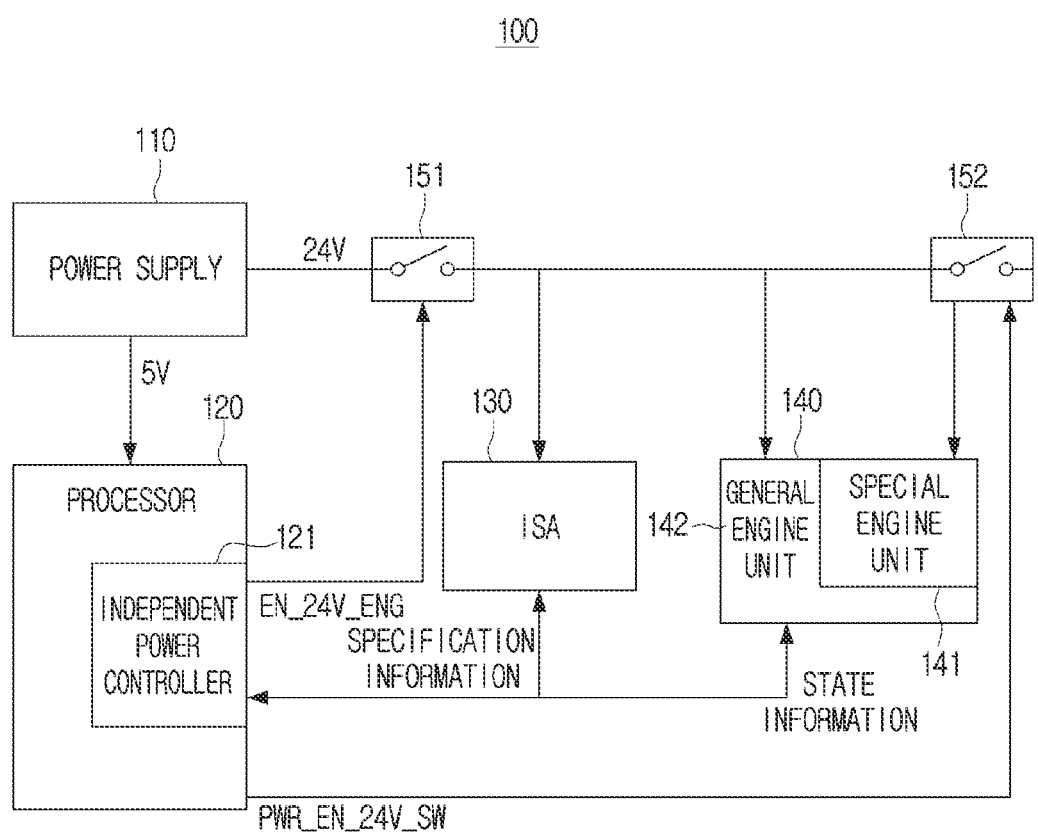
FIG. 2 is a diagram illustrating a configuration of an image forming apparatus according to an example.

FIG. 2 is a diagram illustrating a configuration of an image forming apparatus according to an example.

Referring to FIG. 2, an image forming apparatus 10 may include a power supply 110, a processor 120, an ISA 130, an image forming engine 140, a main power switch 151, and a special engine unit switch 152.

The power supply 110 may supply externally provided power to each configuration of the image forming apparatus. As an example, the power supply 110 may convert alternating current (AC) power of 110V or 220V supplied from the outside to a direct current (DC) power of 5V and 24V. The power supply 110 may supply a DC power of 5V to the processor 120, and may supply a power of 24V to the ISA 130 and the image forming engine 140 through a switch 151, 152. For example, the power supply 110 may be a switching mode power supply (SMPS).

The processor 120 may control an overall operation of the image forming apparatus 100. The processor 120 may include an independent power supply controller 121. The independent power controller 121 may control the main power switch 151 to supply power to the ISA 130 and the image forming engine 141. For example, if the independent power controller 121 causes the main power control signal (EN_24V_ENG) to be in an OFF state, the main power switch 151 may be opened (that is, open-circuited). Consequently, the power supplied from the power supply 110 may not be provided to the ISA 130 or to the image forming engine 140. When the independent power supply controller 121 causes the main power control signal (EN_24V_ENG) to be in the ON state, the main power switch 151 may be closed (that is, short-circuited). The power supplied from the power supply 110 may be provided to the ISA 130 and to the image forming engine 140. The power provided to the image forming engine 140 may be provided to the general engine unit 142 of the image forming engine 140.

The ISA 130 is a scanner unit and may include various specification information. For example, the specification information may include the presence of a multi-feed detection sensor, the specification of the multi-feed detection sensor, the specification of a complementary metal-oxide semiconductor (CMOS) image sensor (CIS), a high speed availability of a scanner driver, the supportable speed of the scanner driver, option information, identification information, or the like. The processor 120 may control the ISA 130 based on the specification information of the ISA 130.

The image forming engine 140 may form an image. The image forming engine 140 may print the print image generated by the processor 120 on the print paper. The image forming engine 140 may perform printing in an electrophotographic manner or perform printing in an ink-jet manner. The image forming engine 140 may be a mono printing engine capable of single color printing and may be a color printing engine capable of color printing.

The image forming engine 140 may include units relating to driving and operation of the image forming apparatus 10. The units relating to driving and operation included in the image forming engine 140 may be classified into a special engine unit 141 and a general engine unit 142. For example, the general engine unit 142 is a unit performing a general operation of the image forming apparatus 100 and may include a unit such as a motor, a fan, a sensor, or the like. The processor 120 may control the general engine unit 142. The image forming engine 140 may include various state information according to the specification of the general engine unit 142. As an example, the state information may include general information for the general engine unit 142, information on the driving unit, information on a dual cassette, a mass cassette, a wireless support availability, presence of a facsimile unit, or the like.

The special engine unit 141 may be a unit that may damage a user when abnormally operated. For example, the special engine unit 141 may include a laser scanner unit (LSU), a registration motor, a fuser, a high voltage power supply (HVPS), or the like. The special engine unit 141 may be controlled by the processor 120.

The processor 120 may control the supply of power to the special engine unit 141 separately from the independent power controller 121. The processor 120 may control the special engine unit power switch 152. For example, if the processor 120 causes a special engine unit power control signal (PWR_EN_24V_SW) to be in the OFF state, the special engine unit power switch 152 may be opened. Therefore, power may not be supplied to the special engine unit 141. When the processor 120 causes the special engine unit power control signal to be in the ON state, the special engine unit power switch 152 may be closed. Accordingly, power may be supplied to the special engine unit 141. For example, referring to FIG. 2, an example of implementing the ISA 130 and the image forming engine 140 separately is described, but the ISA 130 and the image forming engine 140 may be implemented as one configuration.

The configuration of the image forming apparatus 100 has been described. The power control sequence of the image forming apparatus 100 will be described below.

The power supply 110 may be supplied with power from the outside. For example, the power which the power supply 110 receives may be AC power of 110V or 220V. The power supply 110 may convert the supplied external power to the power to be supplied to each configuration of the image forming apparatus 100. For example, the converted power may be DC power of 5V and 24V. The power supply 110 may supply power of 5V to the processor 120 and may output power of 24V. The processor 120 may receive power and perform an initialization process, and may output a main power control signal (END_24V_ENG) through the independent power controller 121. The main power control signal may close the main power switch 151 which had been in the open state.

The input terminal of the main power switch 151 may be connected to the output terminal of 24V of the power supply 110, and the output terminal may be connected to the ISA 130, the image forming engine 140, and the special engine unit power switch 152. The main power switch 151 and the special engine unit power switch 152 may be in an open state initially.

The power (e.g., 24V) transferred from the power supply 110 to the main power switch 151 may be supplied to the ISA 130 and the general engine unit 142 of the image forming engine 140 by the main power control signal. The special engine unit 141 of the image forming engine 140 is separately connected to the output terminal of the special engine unit power switch 152 so that power may not be supplied to the special engine unit 141.

As described above, the power of the special engine unit 141 should be maintained in an off state until the initialization of the processor 120 is completed and the processor 120 is able to control the special engine unit 141 to prevent abnormal operation of the special engine unit 141. For example, if a laser scanner part, which is the special engine unit 141, is abnormally operating, when laser beam of the laser scanner unit is irradiated to the user's eye, the user may lose eyesight. Also by way of additional examples, when the registration motor is abnormally operating, a motor gear unit may cause external injury to a user's hand, and when the fuser is abnormally operating, the user may suffer burns or fire may break out. By way of another example, when the high voltage power supply is abnormally operating, the user may be struck by electricity (that is, the user may be shocked by electricity) due to the high voltage output. Therefore, the special engine unit 141 should be controlled strictly. The power supplied to the special engine unit 141 should turn off power to the point in time at which the special engine unit may be controlled by the processor 120.

While the processor 120 performs the initialization process, the independent power controller 121 of the processor 120 may control the main power switch 151 to supply power to the ISA 130 and the general engine unit 42 of the image forming engine 140. The independent power controller 121 may receive specification information from the ISA 130 and may receive the state information from the image forming engine 140. For example, the specification information may include the presence of a multi-feed detection sensor, the specification of the multi-feed detection sensor, the specification of the CIS, a high speed availability of a scanner driver, the supportable speed of the scanner driver, option information, identification information, or the like. The state information may include general information for the general engine unit, information on the driving unit, a dual cassette, a mass cassette, a wireless support, presence of a facsimile unit, or the like. When the processor 120 performs initialization, the processor 120 may perform software initialization according to the specification of the image forming apparatus 100 by obtaining specification information and state information. The image forming apparatus 100 may not perform unnecessary software processing, thereby enabling fast initialization of the processor 120.

The image forming apparatus 100 may further include a memory (not shown). A memory can store at least one instruction related to the image forming apparatus 100. For example, a variety of programs (or software) for operating the image forming apparatus 100 may be stored according to various examples of the present disclosure. The processor 120 may load an optimal software code into a memory by the obtained specification information of the ISA 130. A firmware code suitable for the image forming apparatus 100 may be loaded into the memory, as activation/deactivation control by software functions of the engine is available by the state information of the image forming engine 140.

When initialization of the processor 120 is completed according to the product specification, the processor 120 may apply the special engine unit power control signal (PWR_EN_24V_SW) to the special engine unit power switch 152. As the special engine unit power switch 152 applied with the special engine unit power control signal is closed, the power supplied from the power supply 110 may be supplied to the special engine unit 141. The special engine unit 141 of the image forming engine 140 may be activated by the power supplied to the special engine unit 141, and all the configurations of the image forming apparatus 100 may be activated to perform normal operation.

The image forming apparatus 100 may control the power of the special engine unit 141 of the image forming engine 140 separately. The image forming apparatus 100 may obtain the specification information of the ISA 130 and the state information of the image forming engine 140 during the initialization process of the processor 120, and may use the information for the initialization process. The image forming apparatus 100 may control the special engine unit 141 separately, and the image forming apparatus 100 may prevent the operation of the special engine unit 141 before the completion of the initialization of the processor 120, thereby preventing abnormal operation.

The image forming apparatus 100 may further include some configurations or may be implemented with changed configurations.

Figure 3:
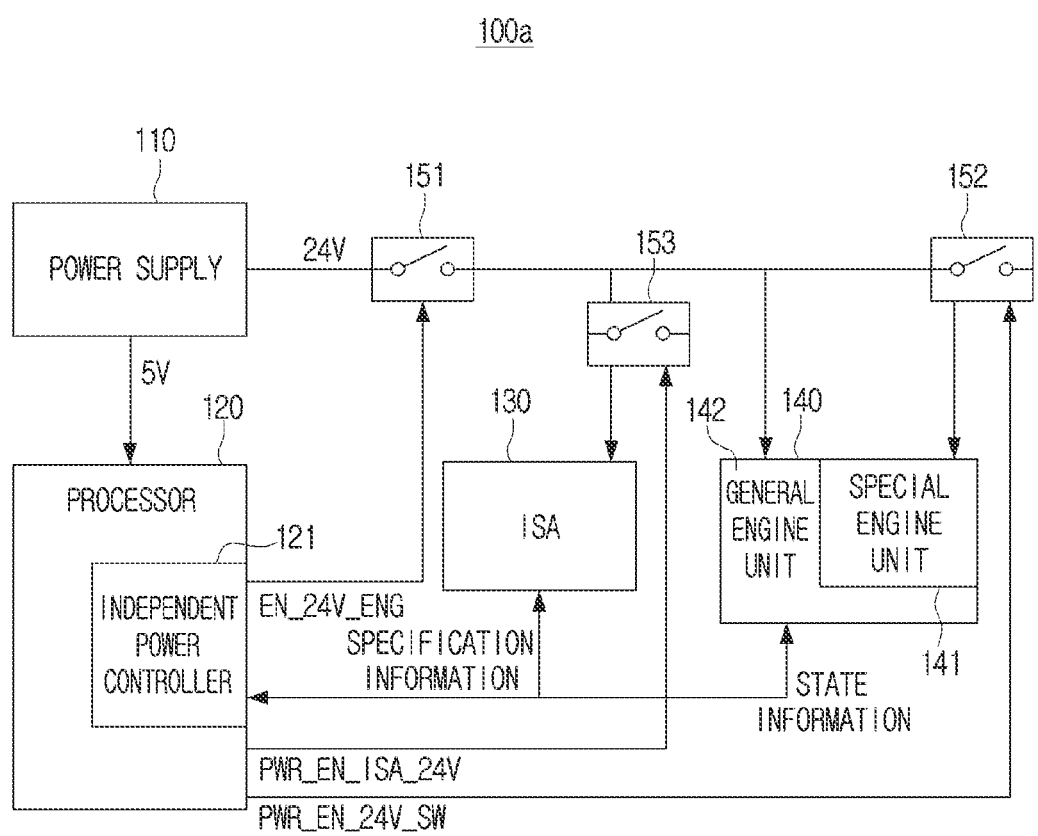
FIG. 3 is a diagram illustrating a configuration of an image forming apparatus for performing a power sequence control process including an ISA power switch according to an example.
Figure 4:
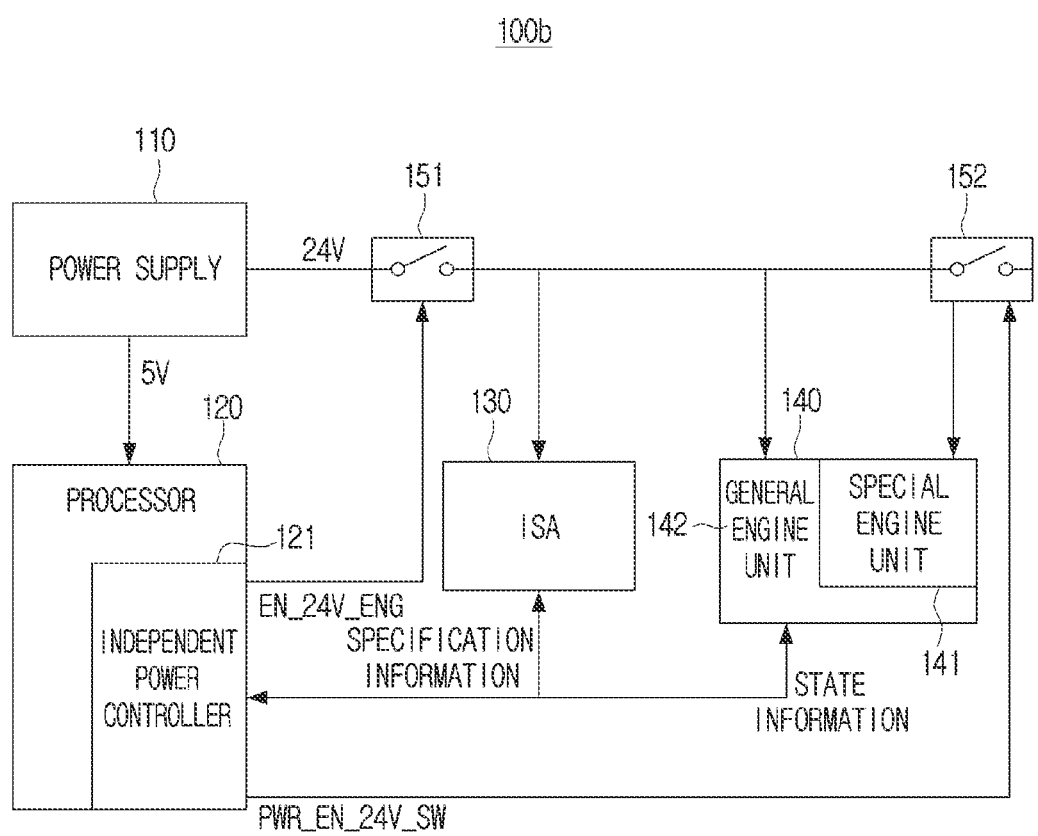
FIG. 4 is a diagram illustrating a configuration of an image forming apparatus for controlling a special engine unit by an independent power controller according to an example.
Figure 5:
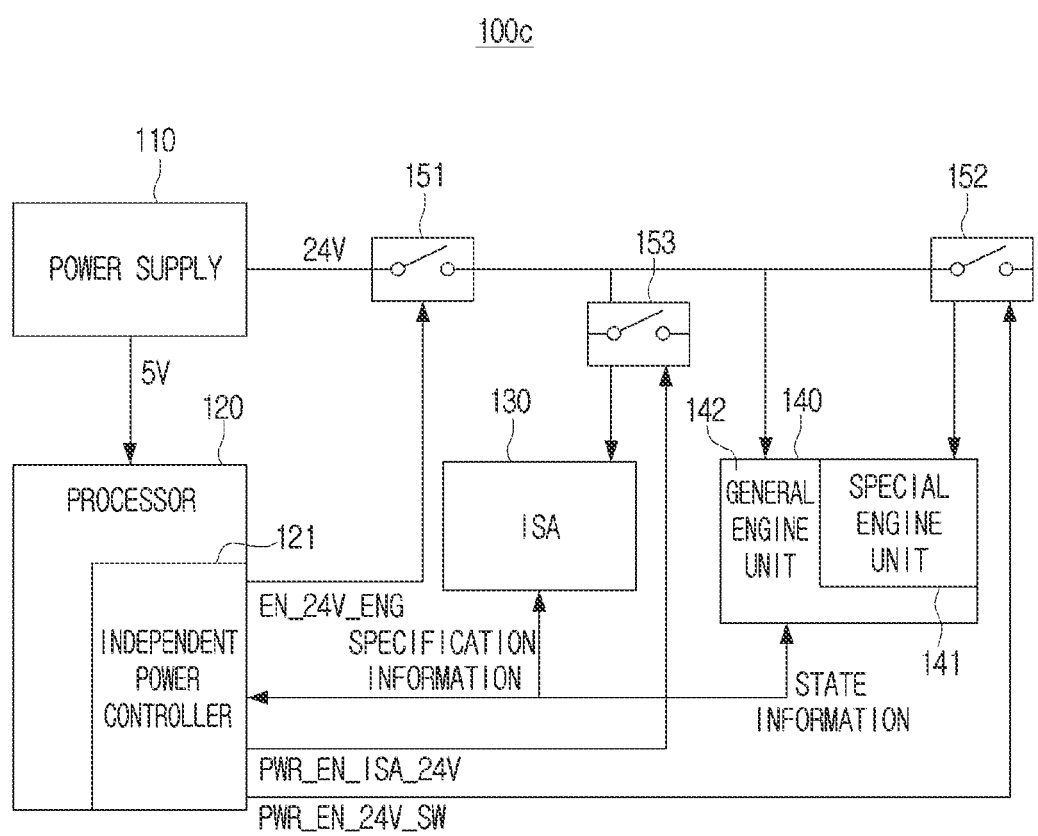
FIG. 5 is a diagram illustrating a configuration of an image forming apparatus including an ISA power switch and controlling a special engine unit by an independent power controller according to an example.

FIG. 3 is a diagram illustrating a configuration of an image forming apparatus for performing a power sequence control process including an ISA power switch according to an example. FIG. 4 is a diagram illustrating a configuration of an image forming apparatus for controlling a special engine unit by an independent power controller according to an example. FIG. 5 is a diagram illustrating a configuration of an image forming apparatus including an ISA power switch and controlling a special engine unit by an independent power controller according to an example. The present examples will be described with reference to FIGS. 3 to 5.

An image forming apparatus 100a of FIG. 3 and an image forming apparatus 100c of FIG. 5 may include the power supply 110, the processor 120, the ISA 130, the image forming engine 140, the main power switch 151, the special engine unit power switch 152, and the ISA power switch 153. The image forming apparatus 100b of FIG. 4 may include the power supply 110, the processor 120, the ISA 130, the image forming engine 140, the main power switch 151, and the special engine unit power switch 152. The processor 120 of FIGS. 3 to 5 may include the independent power supply controller 121, and the image forming engine 140 may include the special engine unit 141 and the general engine unit 142. The power supply 110, the ISA 130, the image forming engine 140, the main power switch 151, and the special engine unit power switch 152 are the same as described in FIG. 2, and thus detailed descriptions thereof will be omitted.

Referring to FIGS. 3 and 5, the image forming apparatus 100a and 100c may include an ISA power switch 153. One end of the ISA switch 153 may be connected to the main power switch 151 and the other end may be connected to the ISA 130. The ISA switch 153 may be controlled by the ISA power control signal (PWR_EN_ISA_24V) of the processor 120. For example, when the ISA power control signal is turned on, the ISA switch 153 may be closed and when the ISA power control signal is turned off, the ISA switch 153 may be opened. The ISA switch 153 may be in an open state initially.

Referring to FIG. 3, the power control sequence of the image forming apparatus 100a will be described.

The power supply 110 may receive power from the outside and may convert the power to power supplied to each configuration of the image forming apparatus 100a. For example, the power supply 110 may supply power of 5V to the processor 120 and may output a power of 24V. The processor 120 may output a main power control signal (EN_24V_ENG) through the independent power controller 121 while receiving power and performing an initialization process. The main power control signal may cause the main power switch 151 in the open state to be closed. The processor 120 may output the ISA power control signal (PWR_EN_ISA_24V) separately from the output of the independent power controller 121. The ISA power control signal may cause the ISA power switch 153 in the open state to be closed.

The power (e.g., 24V) transferred from the power supply 110 to the main power switch 151 may be supplied to the image forming engine 140 by the main power control signal. The power may be supplied to the ISA 130 through the ISA power switch 153 by the ISA power control signal. The special engine unit 141 of the image forming engine 140 is separately connected to the output terminal of the special engine unit power switch 152 so that power may not be supplied.

During the initialization process, the independent power controller 121 of the processor 120 may control the main power switch 151 to supply power to the ISA 130 and the general engine unit 142 of the image forming engine 140. The independent power controller 121 may receive specification information from ISA 130 and may receive the state information from the image forming engine 140.

When initialization of the processor 120 is completed according to the product specification, the processor 120 may apply a special engine unit power control signal (PWR_EN_24V_SW) to the special engine unit power switch 152. The special engine unit power switch 152 applied with the special engine unit power control signal may be closed and the power supplied from the power supply 110 may be supplied to the special engine unit 141. The special engine unit 141 of the image forming engine 140 may be activated by the power supplied to the special engine unit 141, and all the configurations of the image forming apparatus 100a may be activated to perform a normal operation.

Referring to FIG. 4, the power control sequence of the image forming apparatus 100b will be described.

The power supply 110 may receive power from the outside and may convert the power to power to be supplied to each configuration of the image forming apparatus 100b. For example, the power supply 110 may supply power of 5V to the processor 120 and output power of 24V. The processor 120 may receive power and perform an initialization process, and output a main power control signal (EN_24V_ENG) through the independent power controller 121. The main power control signal may cause the main power switch 151 in the open state to be closed.

The power (e.g., 24V) transferred from the power supply 110 to the main power switch 151 may be supplied by the main power control signal to the ISA 130 and the general engine unit 142 of the image forming engine 140. The special engine unit 141 of the image forming engine 140 is separately connected to the output terminal of the special engine unit power switch 152, so that power may not be supplied.

The independent power controller 121 of the processor 120 may control the main power switch 151 to supply power to the ISA 130 and the image forming engine 140 while the processor 120 performs the initialization process. The independent power controller 121 may receive specification information from the ISA 130 and may receive the state information from the image forming engine 140.

Once the initialization of the processor 120 is completed according to the product specification, the independent power controller 121 may apply the special engine unit power control signal (PWR_EN_24V_SW) to the special engine unit power switch 152. The special engine unit power switch 152 applied with the special engine unit power control signal is closed and the power supplied from the power supply 110 may be supplied to the special engine unit 141. The special engine unit 141 of the image forming engine 140 may be activated by the power supplied to the special engine unit 141, and all the configurations of the image forming apparatus 100b may be activated to perform a normal operation.

Referring to FIG. 5, a power control sequence of an image forming apparatus 100c will be described.

The power supply 110 may receive power from the outside and convert the power to power to be supplied to each configuration of the image forming apparatus 100c. For example, the power supply 110 may supply power of 5V to the processor 120 and may output power of 24V. The processor 120 may receive power and perform an initialization process, and output a main power control signal (EN_24V_ENG) and an ISA power control signal (PWR_EN_ISA_24V) through the independent power controller 121. The main power control signal may cause the main power switch 151 in the open state to be closed, and the ISA power control signal may cause the ISA power switch 153 in the open state to be closed.

The power (e.g., 24V) transferred from the power supply 110 to the main power switch 151 may be supplied to the image forming engine 140 by the main power control signal. The power may be supplied to the ISA 130 through the ISA power switch 153 by an ISA power control signal. The special engine unit 141 of the image forming engine 140 is separately connected to the output terminal of the special engine unit power switch 152 so that power may not be supplied.

During the initialization process of the processor 120, the independent power controller 121 of the processor 120 may control the main power switch 151 to supply power to the ISA 130 and the general engine unit 142 of the image forming engine 140. The independent power controller 121 may receive specification information from the ISA 130 and may receive the state information from the image forming engine 140.

When the initialization of the processor 120 is completed to match the product specification, the independent power controller 121 may apply the special engine unit power control signal (PWR_EN_24V_SW) to the special engine unit power switch 152. The special engine unit power switch 152 applied with the special engine unit power control signal is closed and the power supplied from the power supply 110 may be supplied to the special engine unit 141. The special engine unit 141 of the image forming engine 140 may be activated by the power supplied to the special engine unit 141, and all the configurations of the image forming apparatus 100c may be activated to perform a normal operation.

Figure 6:
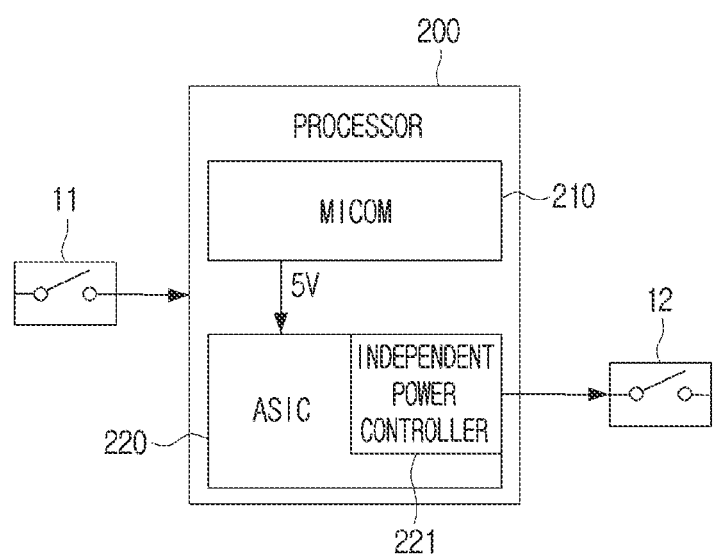
FIG. 6 is a diagram illustrating a specific configuration of a processor according to an example.

FIG. 6 is a diagram illustrating a specific configuration of a processor according to an example.

A processor 200 may include a plurality of controllers. For example, the processor 200 may include a microcomputer (MICOM) 210 and application specific integrated circuit (ASIC) 220.

The power supply may supply power to the MICOM 210 of the processor 200. For example, the MICOM 210 may be supplied with direct current power of 5V. The MICOM 210 supplied with the power may activate the ASIC 220. As an example, the MICOM 210 may have less circuit performance or functionality than the ASIC 220 and may have less power consumption than the ASIC 220. The MICOM 210 may check an input/output interface or system state in a low power mode to reduce power consumption of an image forming apparatus. The MICOM 210 may turn on/off the power supply of the ASIC 220 in a low power mode. Inside the ASIC 220, the independent power controller 221 for checking the specification information of the ISA and the state information of the general engine unit of the image forming engine may be included. As described above, the independent power controller 221 may output the main power control signal and close the main power switch 12.

The image forming apparatus may include an interlock switch 11. The interlock switch 11 may be closed or opened depending on whether the door of the image forming apparatus is opened. For example, the image forming apparatus may include various doors such as a door of a drum mounting unit, a door of a cartridge area unit, and a door of a driving area. The interlock switch 11 may be opened when the door is opened and closed when the door is closed. The interlock switch 11 may operate according to whether the door of the image forming apparatus is opened. For example, the interlock switch 11 may be opened when the door is opened and closed when the door is closed. The processor 200 may block the power supplied to the special engine unit when the interlock switch is opened according to the opening of the door. The interlock switch 11 may operate conversely. That is, when the door is opened, the door may be opened, and when the door is closed, the interlock switch 11 may be opened. The processor 200 may block the power supplied to the special engine unit when the interlock switch is closed according to the opening of the door. The interlock switch 11 may be disposed in each of the respective doors. Alternatively, one interlock switch may operate according to whether the plurality of doors are opened.

The power sequence control process of the image forming apparatus has been described. A power control method will be described below.

Figure 7:
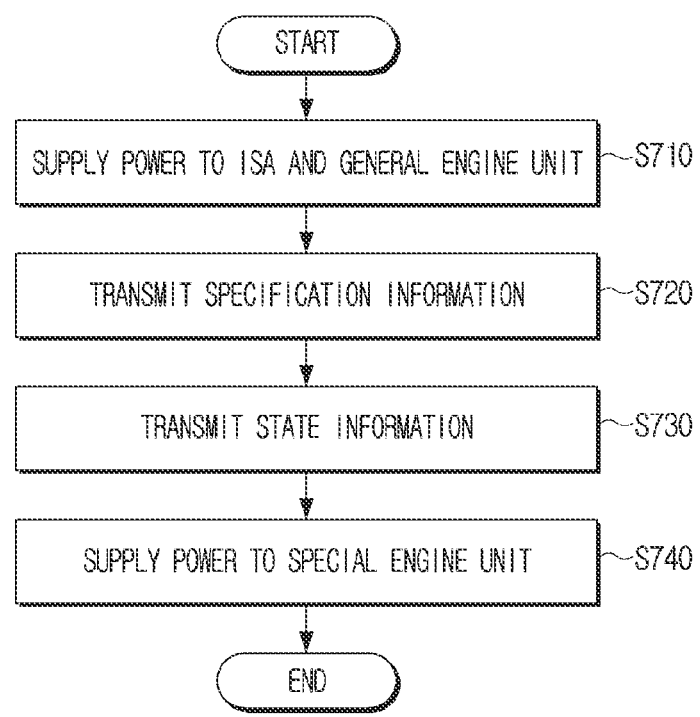
FIG. 7 is a flowchart illustrating a power control method according to an example.

FIG. 7 is a flowchart illustrating a power control method according to an example.

Referring to FIG. 7, the image forming apparatus may supply power to the ISA and the general engine unit of the image forming engine at operation S710. For example, the image forming apparatus may supply power by closing the main power switch through an independent power controller. Alternatively, the image forming apparatus may close the main power switch through the independent power controller to supply power to the general engine unit of the image forming engine, and close the ISA power switch through the processor to supply power to the ISA. Alternatively, the image forming apparatus may supply power to the general engine unit of the image forming engine and the ISA by closing the main power switch and the ISA power switch through the independent power controller.

The processor of the image forming apparatus may include a plurality of controllers of the MICOM and the ASIC. The ASIC may include an independent power supply controller. The MICOM may receive power and activate the ASIC. The ASIC may perform an initialization process before operation of the image forming. The independent power supply controller may output a power control signal during the initialization process of the ASIC to close the main power switch or the ISA power switch. The independent power supply controller may obtain information from the ISA and the image forming engine.

The image forming apparatus may receive specification information from the ISA activated by a supplied power at operation S720. For example, the specification information may include the presence of a multi-feed detection sensor, the specification of the multi-feed detection sensor, the specification of a complementary metal-oxide semiconductor (CMOS) image sensor (CIS), a high speed availability of a scanner driver, the supportable speed of the scanner driver, option information, identification information, or the like.

The image forming apparatus may receive the state information of the image forming engine from the general engine unit of the image forming engine activated by the supplied power at operation S730. As an example, the state information may include general information for the general engine unit, information on the driving unit, information on a dual cassette, a mass cassette, a wireless support, a facsimile unit, or the like. The independent power supply controller of the image forming apparatus may obtain the specification information of the ISA and the state information of the image forming engine during the initialization process of the ASIC. The processor may use the specification information and the state information for an initialization process.

The image forming apparatus may receive specification information and state information and then close the special engine unit power switch to supply power to the special engine unit at operation S740. For example, the special engine unit may include a laser scanner, a registration motor, a fuser, a high voltage power supply, or the like. According to an example, the image forming apparatus may load a program for driving the image forming engine based on specification information and state information, and close the special engine unit power switch after the program is loaded.

The image forming apparatus may include an interlock switch according to the opening of the door. The image forming apparatus may block the power supplied to the special engine unit when the interlock switch is opened according to the opening of the door.

Figure 8:
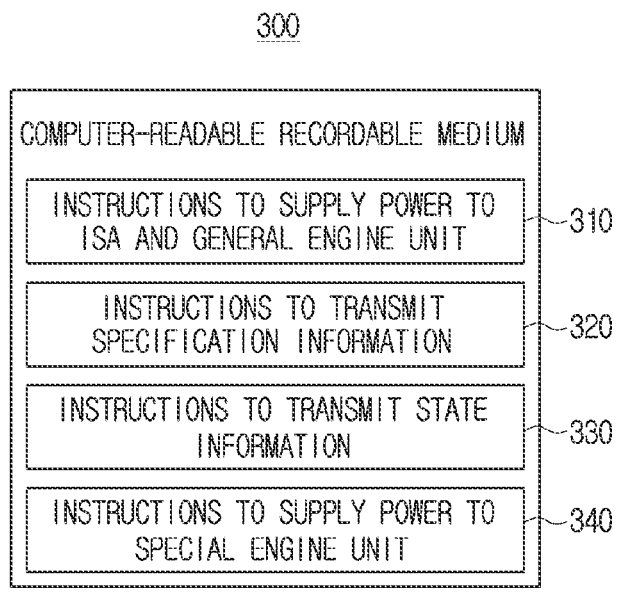
FIG. 8 is a diagram illustrating instructions stored in a computer readable recording medium according to an example.

FIG. 8 is a diagram illustrating instructions stored in a computer readable recording medium according to an example.

The power control process executed in the image forming apparatus described above may be embodied in the form of a computer-readable recording medium storing instructions or data executable by a computer or a processor. The computer-readable recording medium 300 may store instructions related to the operation of the image forming apparatus described above. For example, the computer-readable recording medium 300 may include instructions 310 for supplying power to the ISA and the general engine unit, instructions 320 for transferring specification information in the ISA, instructions 330 for transferring state information in the general engine unit of the image forming engine, and instructions 340 for supplying power to the special engine unit.

Such computer-readable storage media may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage device, optical data storage devices, hard disks, solid-state disks (SSDs), and may be any device capable of storing instructions or software, associated data, data files, data structures, and providing instructions, software, associated data, data files, and data structure to the processor or computer so that the processor or computer may execute instructions.

While the disclosure has been shown and described with reference to various examples thereof, it will be understood by those skilled in the art that various changes in form and details may be made therein without departing from the spirit and scope of the disclosure as defined by the appended claims and their equivalents.

The invention claimed is:
1. A power control device comprising:
a power supply;
an image forming engine including a general engine unit and a special engine unit;
an integrated scanner assembly (ISA);
a first switch to: receive power form the power supply and provide power to the general engine unit, the ISA, and a second switch when closed;

the second switch to: receive power from the first switch and supply power to the special engine unit when closed; and a processor, including an independent power controller, to;

receive power output by the power supply;

control power supplied to the ISA, the general engine unit, and the second switch by closing the first switch utilizing the independent power controller;

receive specification information from the ISA;

receive state information from the general engine unit; and control power supplied to the special engine unit by closing the second switch in response to receiving the specification information and the state information.

2. The power control device of claim 1, further comprising:

a third switch, wherein the processor controls power supplied to the ISA by closing the first switch through the independent power controller and closing the third switch.

3. The power control device of claim 2, wherein the processor controls power supplied to the ISA by closing the first switch and the second switch through the independent power controller.

4. The power control device of claim 1, wherein the processor controls power supplied to the special engine unit by closing the second switch through the independent power controller.

5. The power control device of claim 1, wherein the processor comprises:

a microcomputer (MICOM); and an application specific integrated circuit (ASIC) including the independent power controller, wherein the MICOM receives power from the power supply and turns the ASIC on.

6. The power control device of claim 5, wherein the ASIC loads a program to drive the image forming engine based on the specification information and the state information and closes the second switch after loading the program.

7. The power control device of claim 5, wherein the MICOM enters a low power mode when not in use, the low power mode including turning off the ASIC.

8. The power control device of claim 1, further comprising:

a fourth switch to operate according to whether a door of an image forming apparatus is opened, wherein the processor blocks power supplied to the special engine unit when the fourth switch is opened according to opening of the door.

9. The power control device of claim 1, wherein the special engine unit controls at least one of a laser scanner unit (LSU), a registration motor, a fuser, or a high voltage power supply (HVPS).

10. The power control device of claim 1, wherein the specification information comprises information on the components of ISA and the image forming engine including at least one of a multi-feed detection sensor, supportable speed of a scanner driver, option information, or identification information.

11. The power control device of claim 1, wherein the state information comprises information on the status of the image forming engine including one of state information of a driver of the image forming engine, cassette specification information, wireless availability information, or facsimile information.

12. A method comprising:

supplying power to an integrated scanner assembly (ISA) and to a general engine unit by closing a first switch utilizing an independent power controller;

receiving specification information from the ISA activated by the supplied power;

receiving state information from the general engine unit activated by the supplied power; and supplying power to a special engine unit by closing a second switch in response to receiving the specification information and the state information.

13. The method of claim 12, comprising:

receiving power from a power supply and turning an application specific integrated circuit (ASIC) including the independent power controller on.

14. The method of claim 13, wherein the supplying power to the special engine unit comprises loading a program for driving the special engine unit based on the specification information and the state information and closing the special engine unit power switch after loading the program.

15. The method of claim 12, comprising:

blocking power supplied to the special engine unit when an interlock switch is opened according to opening of a door.

* * * * *